July 4, 1933.  A. A. DAVID  1,916,192

AGITATING AND DISINTEGRATING DEVICE

Filed Dec. 14, 1931

Inventor:
Alexandre Anctil David
By
Attorney

Patented July 4, 1933

1,916,192

UNITED STATES PATENT OFFICE

ALEXANDRE ANCTIL DAVID, OF MONTREAL, QUEBEC, CANADA

AGITATING AND DISINTEGRATING DEVICE

Application filed December 14, 1931, Serial No. 580,888, and in Canada May 23, 1931.

The present invention pertains to a novel device for agitating and disintegrating the contents of a vessel or vat.

The principal object of the invention is to provide a device of this character particularly useful in the maturation of fermentable substances, although not restricted to this use but having general applicability. A further object of the invention is to provide such a device which constantly brings different parts of the material into the zone where the disintegrating action takes place.

The device comprises a hub having a series of blades extending outwardly therefrom in planes inclined to the axis of the hub, after the fashion of propeller blades. This formation causes agitation of the material, and the outer ends of the blades are serrated or toothed for striking and disintegrating the solid particles as the material is being agitated. The hub may further carry beater arms which are sharpened in the direction of rotation for increasing the agitating and disintegrating actions.

Figure 1:
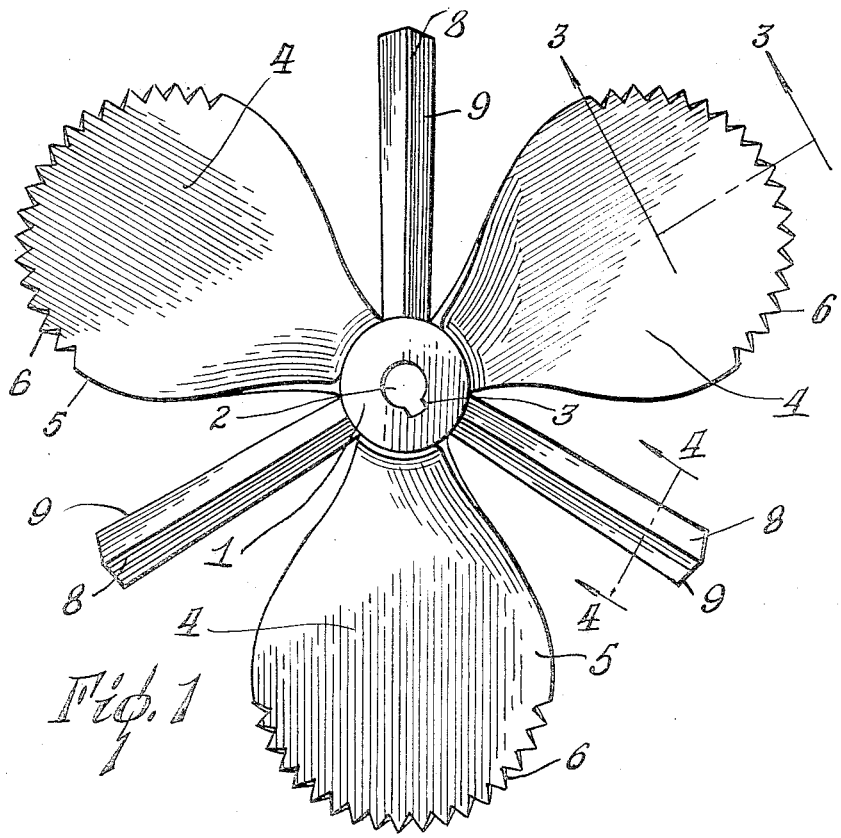
Figure 2:
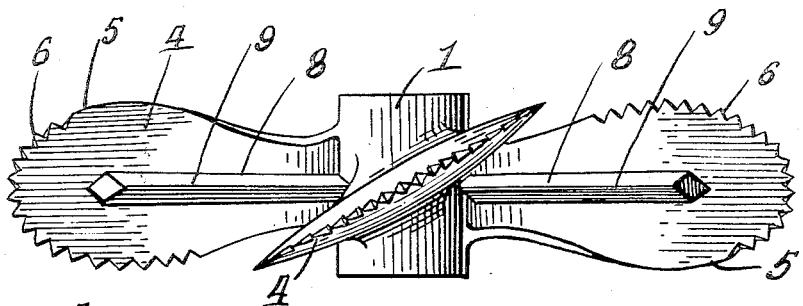
Figure 3:
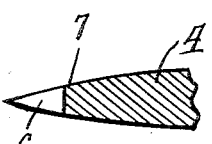
Figure 4:
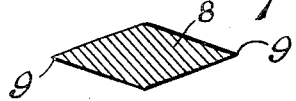

The invention is fully disclosed by way of example in the following description and in the accompanying drawing in which Figure 1 is a plan view of the device;
Figure 2 is a side elevation thereof;
Figure 3 is a section on the line 3—3 of Figure 1; and
Figure 4 is a section on the line 4—4 of Figure 1.

Reference to these views will now be made by use of like characters which are employed to designate corresponding parts throughout.

The device comprises a boss or hub 1 having a central bore 2 and a key slot 3 whereby it may be secured to a shaft. The hub is formed with a series of blades 4 extending outwardly in a substantially radial manner. Each blade is inclined at an angle of approximately 45° to a plane passed transversely through the hub, after the fashion of propeller blades. In other words, the blades may be said to be inclined approximately 45° to the longitudinal axis of the hub 1.

The ends 5 of the blades are rounded and further serrated to form series of teeth 6. Moreover, the ends 5 and hence the teeth 6 are pointed as at 7 by the tapering of the blades towards said edges, as shown more clearly in Figure 3.

Alternating with the blades are radial paddles or arms 8 also extending outwardly from the hub 1. These members are diamond shaped in cross section, presenting edges 9 in whichever direction the device may be rotated, as shown in Figure 4.

In operation, the device is mounted on a rotary shaft in a vessel containing a substance to be agitated and disintegrated. An example of the use of the invention occurs in the maturation of fermentable substances although the invention is not to be regarded as limited thereto. The series of teeth 6 generate a cylindrical surface rather than merely a circle, because of the inclination of the blades 4. Thus, a considerable portion of the contents of the vessel is attacked by the teeth in each revolution of the hub 1. Furthermore, because of the inclination of the blades, the mixture is constantly in agitation, and new portions thereof are continually carried into the path of the blades and teeth. The sharpened paddles 8 also aid in the agitation and disintegrating of the mixture.

Although a specific embodiment of the invention has been illustrated and described, it will be understood that various alterations in the details of construction may be made without departing from the scope of the invention as indicated by the appended claims.

What I claim is:—

1. An agitating and disintegrating device comprising a hub, blades extending outwardly from said hub and lying in planes inclined to the longitudinal axis thereof, the outer ends of said blades being serrated to form teeth, and arms extending outwardly from said hub and alternating with said blades, all of said blades being symmetrical to one plane transverse of said hub.

2. An agitating and disintegrating device comprising a hub, blades extending outwardly from said hub and lying in planes inclined to the longitudinal axis thereof, the outer ends of said blades being serrated to form teeth, and arms extending outwardly from said hub and alternating with said blades, said arms having sharpened edges presented in the direction of rotation of said hub, all of said blades being symmetrical to one plane transverse of said hub.

3. An agitating and disintegrating device comprising a hub, blades extending outwardly from said hub and lying in planes inclined to the longitudinal axis thereof, said blades tapering towards their outer ends, said outer ends being serrated to form teeth, and arms extending outwardly from said hub and alternating with said blades, all of said blades being symmetrical to one plane transverse of said hub.

4. An agitating and disintegrating device comprising a hub, blades extending outwardly from said hub and lying in planes inclined to the longitudinal axis thereof, said blades tapering towards their outer ends, said outer ends being serrated to form teeth, and arms extending outwardly from said hub and alternating with said blades, said arms having sharpened edges presented in the direction of rotation of said hub, all of said blades being symmetrical to one plane transverse of said hub.

ALEXANDRE ANCTIL DAVID.